Sept. 25, 1951 J. E. BECKER 2,568,706
FLUID CIRCULATION CONTROL FOR FLUID COUPLINGS
Filed Nov. 28, 1947 3 Sheets-Sheet 1

Inventor
JOHN E. BECKER
By
Attorney

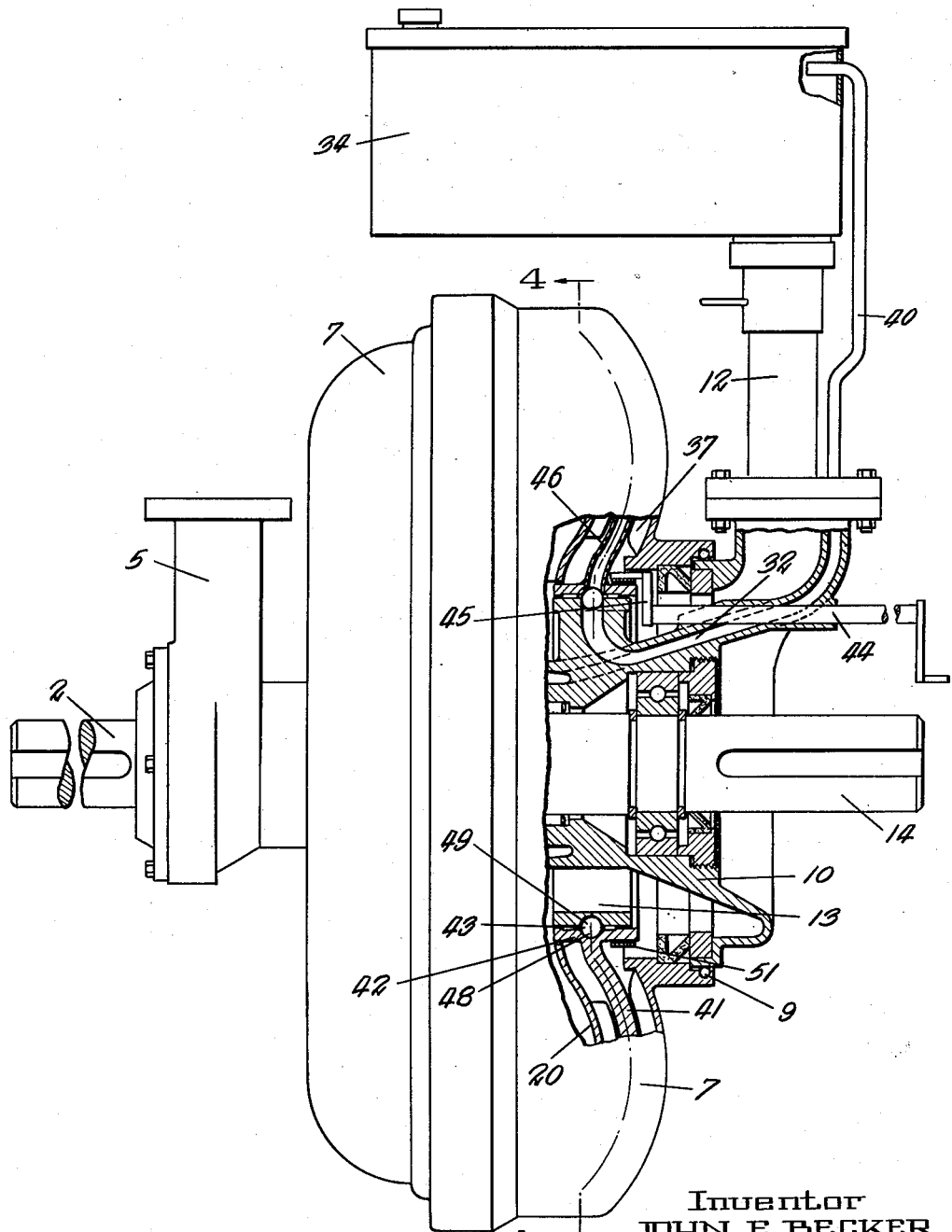

Sept. 25, 1951           J. E. BECKER           2,568,706
FLUID CIRCULATION CONTROL FOR FLUID COUPLINGS
Filed Nov. 28, 1947           3 Sheets-Sheet 3
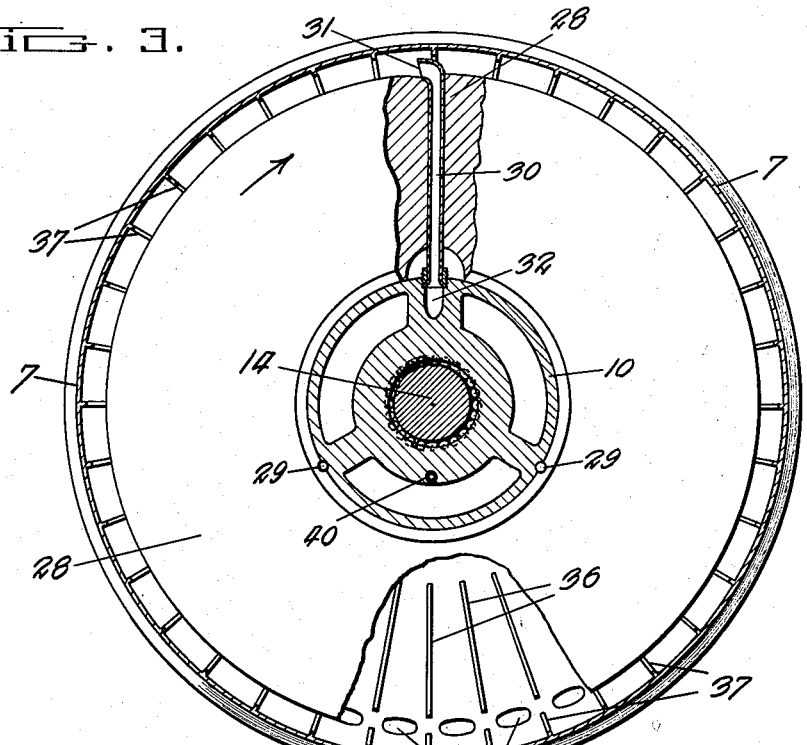
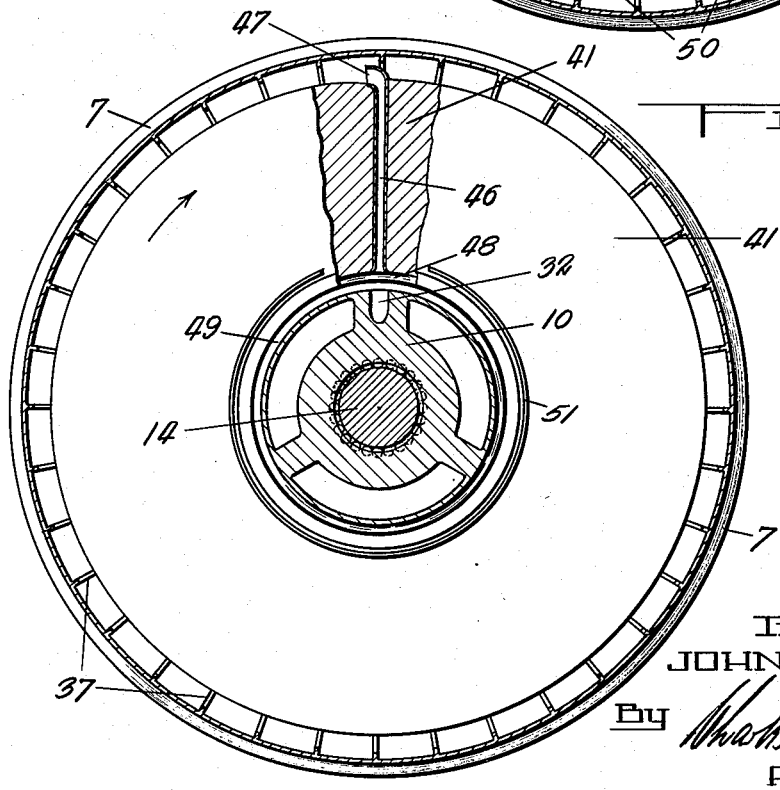
Inventor
JOHN E. BECKER
By
Attorney Patented Sept. 25, 1951

2,568,706

UNITED STATES PATENT OFFICE 2,568,706

FLUID CIRCULATION CONTROL FOR FLUID COUPLINGS

John Edward Becker, Darlington Township, Durham County, Ontario, Canada

Application November 28, 1947, Serial No. 788,500

5 Claims. (Cl. 60—54)

This invention relates to improvements in fluid circulation controls for fluid couplings and is a continuation-in-part of my patent application Serial No. 749,562, filed May 21, 1947, issued as Patent No. 2,508,442, May 23, 1950, wherein I disclosed the use of a stationary fluid discharge pipe designed to have a scooping action for removing fluid from the rotating impeller housing.

The object of the present invention is to improve the mounting of the scoop pipe whereby fluid turbulences are very substantially reduced, and to also furnish internal radial vanes contained within the impeller housing which assist in throwing the fluid to the outer periphery of the casing; these vanes also preventing slippage between the contained fluid and the inner walls of the impeller housing whereby fluid discharge speed is very materially increased.

In order to obviate the turbulence caused by the scoop pipe protruding into the rotating fluid ring, the pipe is contained within a disc which is mounted concentrically with the centre of rotation of the impeller housing thus eliminating fluid impact against the side of the length of the pipe as the fluid ring rotates.

Another and important feature of my invention is to provide an alternative construction wherein the disc with its contained scoop pipe is mounted for free rotation in conjunction with the fluid ring and housing, so that when rotating no scooping action is in effect; and to furnish a braking mechanism controlling the rotation of the disc and scoop pipe whereby a slowing down of the speed of rotation of the disc and pipe in relation to the speed of rotation of the fluid ring and housing causes the scoop pipe to remove fluid from the coupling.

With the foregoing and other objects in view as shall hereinafter appear, my invention consists of a fluid coupling constructed and arranged all as hereinafter more particularly described and illustrated in the accompanying drawings in which:

Fig. 2 is a side elevational view of a coupling and tank incorporating the alternative construction, the central portion of the coupling housing being broken away to disclosed the rotatable disc mounting and the brake mechanism.

Fig. 3 is a vertical cross-sectional view taken through the line 3—3, Fig. 1, and Fig. 4 is a vertical cross-sectional view taken through the line 4—4, Fig. 2.

Like characters of reference indicate corresponding parts in the different views of the drawings.

Figure 1:
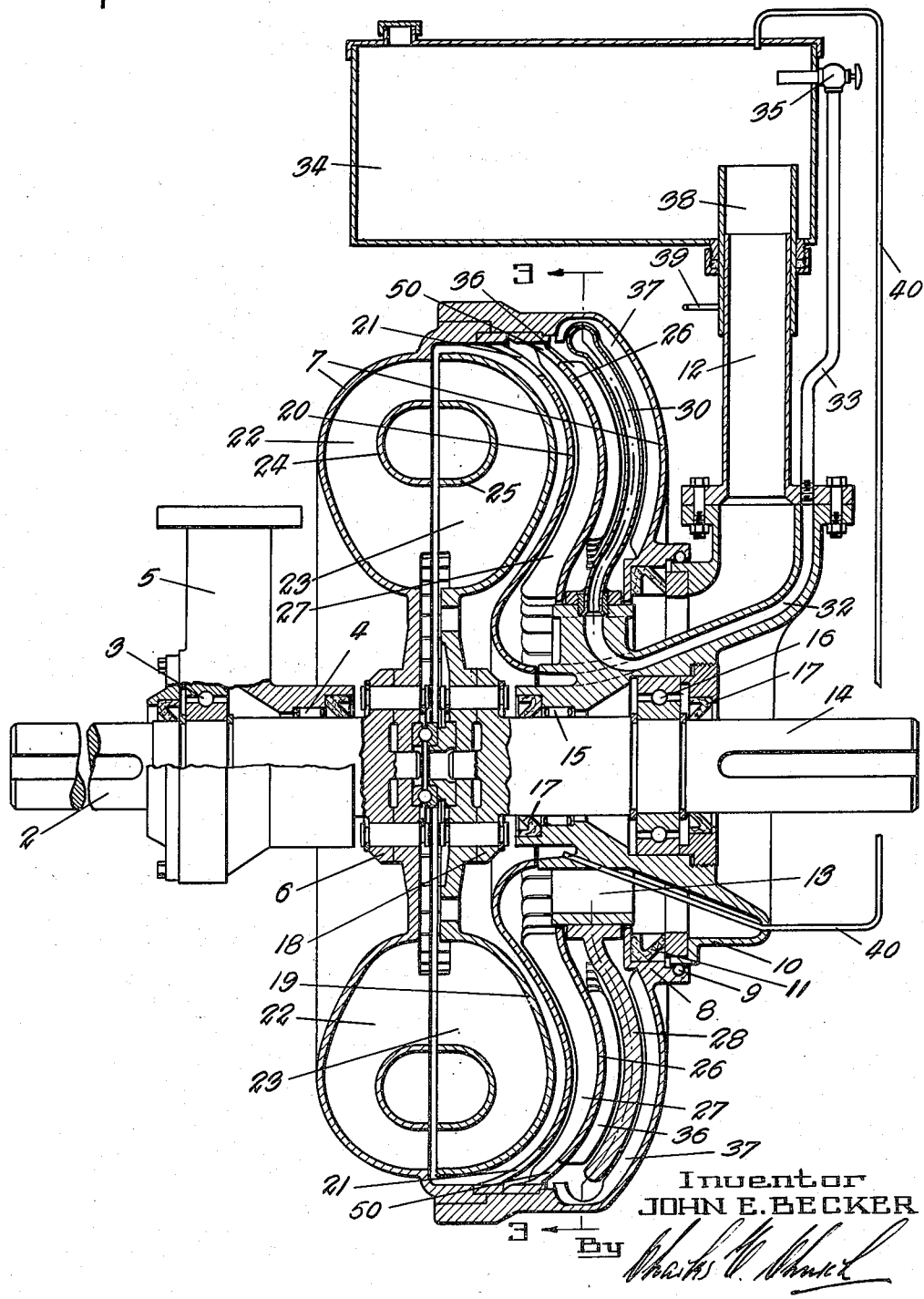
Fig. 1 is a vertical longitudinal cross-sectional view through the coupling assembly and fluid reservoir tank.

Referring to Fig. 1, the driving shaft 2 is supported by ball and roller races 3 and 4 carried within a suitably supported bearing bracket 5. The inner end of the driving shaft 2 is formed with a flange 6, and an impeller housing 7 of orbicular form and of substantially 8-shaped cross-section is secured to the face of the flange 6 to rotate with the driving shaft 2. The inner portion 8 of the housing 7, remote from the portion secured to the flange 6, is carried by a ball bearing 9 mounted upon a stationary hub shell 10. A fluid seal ring 11 is positioned adjacent to the ball bearing 9. A fluid feed pipe 12 extends upwardly from the hub shell 10, being in communication with an annular chamber 13 formed within the hub shell and opening into the impeller housing 7.

The hub shell 10 contains a driven shaft 14 which is mounted within roller and ball races 15 and 16, fluid seal rings 17 being also provided. The inner end of the driven shaft 14 carries a flange 18, and a concave ring-shaped runner housing 19 is secured to the flange and contained within the impeller housing 7. The impeller housing 7 contains a partition wall 20 which is shaped to follow the contour of the runner housing 19. The outer edge of the partition 20 is welded or otherwise secured to the inner face of the peripheral wall of the housing 7 and its centre formed with an orifice of greater diameter than the portion of the stationary hub 10 which it surrounds. The outer portion of the partition wall is pierced with a plurality of orifices 21 through which fluid passes in entering and leaving the housing 7.

The impeller housing 7 and the runner housing 19 carry a plurality of the usual radial impeller blades 22 and 23, supporting the usual ring members 24 and 25, so that passages are formed for the fluid transmission of power.

The impeller housing 7 contains a second partition wall 26 which is shaped to follow the contour of the partition wall 20 and is spaced away therefrom to form a fluid inlet compartment bounded by the partitions 20 and 26 and communicating with the annular chamber 13 within the hub shell 10. The partition wall 26 rotates free of the hub shell 10 and has its outer edge secured to the inner face of the peripheral wall of the housing 7, the peripheral portion of the wall being pierced with a number of fluid evacuation orifices 50. The partition wall 26 carries a plurality of radially positioned vanes 27 which function to reduce slippage of the rotating fluid ring within the fluid inlet compartment of the housing 7, thus accelerating the entrance of fluid into the periphery of the housing when the housing is being filled.

The hub 10 carries a disc 28 which is suitably secured thereon, as by key pins 29, the disc being positioned between the partition 26 and the rear wall of the housing 7 and shaped to follow the contour of the space between the partition wall and the housing. A scoop pipe 30 is radially positioned within the disc 28 and has its outer end containing the fluid inlet orifice 31 protruding from the periphery of the disc, and directed toward the direction of rotation as shown by the arrow in Fig. 3. The inner end of the pipe 30 communicates with a passage 32 within the hub 10, which passage is connected to a vertical pipe 33 opening into a reservoir 34 and controlled by a valve 35.

In order to prevent slippage of the fluid ring within the disc containing space in the impeller housing, the partition 26 and the rear wall of the housing 7 carry a plurality of radially positioned vanes 36 and 37. The vanes 36 and 37 cause the fluid ring between the partition and the rear wall of the housing 7 to rotate at substantially the same speed as the housing whereby opening of the valve 35 will cause the scoop pipe to immediately evacuate the fluid ring from the housing 7.

The upper end of the fluid pipe 12 which also extends to the reservoir 34 is contained within a slidable regulating sleeve 38 which projects upwardly into the reservoir and may be adjusted in height by means of a handle 39.

To enable air to readily escape from the impeller housing 7 when fluid is admitted into the housing through the annular chamber 13 in the hub 10, a pipe 40 extends from the inner end of the hub 10 to the reservoir 34.

*Operation.*—Fluid is contained within the reservoir 34 and is admitted to the coupling through the feed pipe 12. The quantity of fluid admitted is governed by adjustment of the height of the slidable regulating sleeve 38. When the top of the regulating sleeve is below the level of the fluid in the reservoir, fluid will flow downwardly through the pipe 12 until the fluid level in the reservoir coincides with the top of the sleeve.

To put the coupling as shown in Fig. 1 into operation, fluid is permitted to pass from the reservoir into the impeller housing 7; the fluid passing through the annular chamber 13 within the hub shell 10 and entering the compartment bounded by the partitions 20 and 26 to flow between the radial vanes 27 to the periphery of the housing 7 under the centrifugal force of the rotation of the housing assembly by the driving shaft 2. The fluid flows through the orifices 21 in the partition wall 20 into the portion of the housing 7 containing the impeller blades 22 and 23.

When the driving shaft 2 is in motion, the fluid rotating from the impeller blades 22 will impact the runner blades 23 with the resultant rotation of the runner housing 19 and the driven shaft 14 secured thereto. It will be seen that the complete coupling assembly, with the exception of the hub and bearing assembly supports, will be rotating. As the disc 28 carrying the scoop pipe 30 is stationary, being secured to the hub 10, the rotating movement of the coupling will tend to direct fluid into the pipe. If the valve 35 is closed there will be no passage of fluid through the pipe 30 and the quantity of fluid in the coupling will remain constant.

To remove a proportion of fluid from the coupling in order to reduce the speed of the driven shaft 14, relatively to the speed of the driving shaft 2, it is only necessary to open the valve 35 to the desired extent, when fluid will be scooped out of the impeller housing through the open end 31 of the pipe 30. The return of fluid to the coupling is controlled by regulation of the height of the sleeve 38.

As the pipe 30 discharges into the reservoir 34 through the pipe 33, and as fluid may be fed into the coupling through the feed pipe 12, it will be appreciated that fluid may be continuously withdrawn from the coupling into the reservoir and fed from the reservoir into the coupling; the proportion of fluid withdrawn to the proportion of fluid returned being regulated by adjustment of the valve 35 and sleeve 38. In this manner any driven shaft speed may be obtained and retained, ranging from the speed of the driving shaft, to reducing the driven shaft speed to a standstill.

It will be readily appreciated that by the provision of the disc 28, in which the scoop pipe 30 is embedded, that as the fluid ring rotates about the outer portion of the disc that there will be little or no turbulence and that fluid impact against the scoop pipe 30 will be eliminated with the exception of the protruding end of the pipe carrying the fluid inlet orifice 31.

Figs. 2 and 4 show an alternative fluid discharge construction whereby fluid is removed from the coupling. In this construction a rotatable discharge pipe containing disc 41 is provided to take the place of the stationary disc 28 as used in the construction as shown in Figs. 1 and 3. The disc 41 is formed with a boss 42 mounted upon a ball bearing 43 carried by the hub 10; fluid flowing from the pipe 12 into the coupling in the same manner as in the construction shown in Figs. 1 and 3. One portion of the boss 42 is surrounded by a brake band 51 which is actuated by a manually operated handle 44 extending through the hub 10 and carrying an arm 45 on its inner end which is connected to the brake band so that rotation of the handle 44 in one direction will cause the brake band to engage the boss 42 and thus retard rotation of the disc 41.

The disc 41 contains a radial pipe 46 embedded therein and having its outer end protruding from the periphery of the disc and formed with a fluid entrance orifice 47 directed towards the direction of rotation. The inner face of the hub 42 is formed with a fluid passage groove 48 which is complementary to a similar groove 49 in the hub 10. The groove 49 opens into the passageway 32 within the hub 10 and which is connected to the vertical pipe 33. The inner end of the scoop pipe 46 opens into the groove 48 in the disc 41, so that fluid may always flow from the scoop pipe 46 through the grooves 48 and 49 into the passageway 32. The other constructional details of this coupling are the same as the construction shown in Fig. 1.

*Operation.*—When full power is being transmitted from the driving shaft 2 to the driven shaft 14 the disc 41 is permitted to freely rotate, and will do so at substantially the same speed as the speed of rotation of the fluid ring within the impeller housing 7. In this particular construction it is not necessary to provide the regulating valve 35 in the discharge pipe 33.

If it is desired to reduce the speed of the driven shaft 14 in relation to the speed of the driving shaft 2, the brake 51 is partially applied through actuation of the handle 44 so that the speed of rotation of the disc 41 in relation to the speed of rotation of the fluid ring in the coupling is reduced, whereby fluid in the ring will be moving faster than the outer end of the scoop pipe and will therefore enter the scoop pipe to be discharged into the reservoir 34. The return of fluid from the reservoir to the coupling is governed by adjustment of the height of the sleeve 38. If it is desired to bring the driven shaft 14 to a standstill the brake 51 is fully applied so that the rotative movement of the disc 41 is brought to a standstill whereby fluid is entirely removed from the impeller housing 7.

While I have shown certain constructions of my invention, it is to be understood that I do not limit myself to the particular assemblies shown and that I may make any such changes and alterations as may seem desirable without departing from the spirit of my invention as set forth in the appended claims.

What I claim as my invention is:

1. A fluid coupling comprising a rotatable circular driving impeller housing having a plurality of radial impeller blades secured within one end portion thereof, a driven runner housing having a plurality of radial runner blades therein and contained within the impeller housing adjacent to the radial impeller blades, a partition wall contained within the impeller housing adjacent to the runner blades and containing a plurality of fluid passage orifices in its peripheral portion, a second partition wall contained within the impeller housing and spaced away from the first partition wall to form a fluid inlet compartment bounded by the two partitions, said second partition wall being also spaced away from the end wall of the impeller housing remote from the impeller blades to form a fluid evacuation chamber which communicates with the fluid inlet compartment through a plurality of fluid evacuation orifices arranged in the peripheral portion of the second partition wall, a stationary disc concentrically contained within the fluid evacuation chamber, a fluid evacuating scoop pipe contained within the disc and extending from its central portion to its periphery, a fluid inlet scoop head projecting from the periphery of the disc and communicating with the scoop pipe in the disc, the fluid inlet orifice in the head facing in a direction opposite to the direction of rotation of the fluid evacuation chamber, a fluid reservoir, a fluid evacuating conduit extending from the end of the pipe bore in the central portion of the disc to the fluid reservoir, whereby a coupling fluid evacuation passage is constituted by the orifices in the partition walls and the fluid evacuation chamber and thence through the disc scoop pipe to the evacuating conduit, a fluid feed pipe extending from the fluid reservoir to the central portion of the fluid inlet compartment, and means for independently controlling the passage of fluid through the fluid evacuating conduit and the fluid feed pipe.

2. A fluid coupling as claimed in claim 1, wherein the second mentioned partition wall is of ring form and the fluid feed pipe communicates with its central orifice.

3. A fluid coupling as claimed in claim 1, wherein the second mentioned partition wall is of ring form and is secured at its periphery to the inner face of the impeller housing, the fluid feed pipe communicating with the central orifice of the wall, and a plurality of radial vanes protruding from the face of the wall into the fluid inlet compartment and extending from the central orifice in the wall to the portion of the wall opposite the fluid passage orifices in the partition wall which is adjacent to the runner blades.

4. A fluid coupling as claimed in claim 1, wherein the fluid evacuating scoop pipe containing disc is mounted for free rotation with the impeller housing, brake means for controlling the speed of rotation of the disc, and wherein the second mentioned partition wall is of ring form and the fluid feed pipe communicates with its central orifice.

5. A fluid coupling as claimed in claim 1, wherein the fluid evacuating scoop pipe containing disc is mounted for free rotation with the impeller housing, and wherein the second mentioned partition wall is of ring form and is secured at its periphery to the inner face of the impeller housing, the fluid feed pipe communicating with the central orifice of the wall, and a plurality of radial vanes protruding from the face of the wall into the fluid inlet compartment and extending from the central orifice in the wall to the portion of the wall opposite the fluid passage orifices in the partition wall which is adjacent to the runner blades.

JOHN EDWARD BECKER.

REFERENCES CITED

The following references are of record in the file of this patent:

UNITED STATES PATENTS

| Number | Name | Date |
|---|---|---|
| 1,859,607 | Sinclair | May 25, 1932 |
| 1,938,357 | Sinclair | Dec. 5, 1933 |
| 2,187,656 | Kiep et al. | Jan. 16, 1940 |
| 2,284,362 | Birmann | May 26, 1942 |
| 2,419,919 | Sinclair | Apr. 29, 1947 |
| 2,422,850 | Porter | June 24, 1947 |
| 2,436,034 | Buehler | Feb. 17, 1948 |